May 2, 1939.　　　　G. M. HARRIS　　　　2,156,652
MANUFACTURE OF WIRE STRANDS
Filed March 29, 1938　　10 Sheets-Sheet 1

INVENTOR
GAVIN MURE HARRIS
ATTORNEYS

May 2, 1939.   G. M. HARRIS   2,156,652
MANUFACTURE OF WIRE STRANDS
Filed March 29, 1938    10 Sheets-Sheet 2

INVENTOR
GAVIN MURE HARRIS
BY Stebbins, Blenko & Parmelee
ATTORNEYS

May 2, 1939.  G. M. HARRIS  2,156,652
MANUFACTURE OF WIRE STRANDS
Filed March 29, 1938  10 Sheets-Sheet 3

INVENTOR
GAVIN MURE HARRIS
BY Stebbins, Blenko & Parmelee
ATTORNEYS

May 2, 1939.  G. M. HARRIS  2,156,652

MANUFACTURE OF WIRE STRANDS

Filed March 29, 1938   10 Sheets-Sheet 4

INVENTOR
GAVIN MURE HARRIS

By Stebbins, Blenko & Parmelee

ATTORNEYS

May 2, 1939.  G. M. HARRIS  2,156,652
MANUFACTURE OF WIRE STRANDS
Filed March 29, 1938   10 Sheets-Sheet 5

INVENTOR
GAVIN MURE HARRIS
By Stebbins, Blenko & Parmelee
ATTORNEYS

May 2, 1939. G. M. HARRIS 2,156,652
MANUFACTURE OF WIRE STRANDS
Filed March 29, 1938 10 Sheets-Sheet 8

INVENTOR
GAVIN MURE HARRIS
BY Stebbins, Blenko + Parmelee
ATTORNEYS

INVENTOR
GAVIN MURE HARRIS
ATTORNEYS

May 2, 1939. G. M. HARRIS 2,156,652

MANUFACTURE OF WIRE STRANDS

Filed March 29, 1938     10 Sheets—Sheet 10

INVENTOR
GAVIN MURE HARRIS
BY *Stebbins, Blenko & Parmelee*

ATTORNEYS

Patented May 2, 1939

2,156,652

UNITED STATES PATENT OFFICE 2,156,652

MANUFACTURE OF WIRE STRANDS

Gavin Mure Harris, London, England, assignor to Callender's Cable and Construction Company Limited, London, England, a British company Application March 29, 1938, Serial No. 198,666
In Great Britain March 16, 1936

13 Claims. (Cl. 57—145)

It has been recognised that for many purposes it is advantageous in manufacturing wire strands to produce a more compact strand than that which results from the assembly of wires of circular cross sections. The present invention deals with the production of compact strands by a method of the type in which wires initially circular are deformed in shape during the assembly in the strand, so that they fit together more completely than is the case with circular wires and thus leave between them less volume of unoccupied space. Such strands are referred to hereinafter as compacted wire strands.

This application is a continuation-in-part of my copending application, Serial No. 131,255, filed March 16, 1937, for the Manufacture of wire strands.

In particular the invention is concerned with the manufacture of compacted wire strands consisting of one or more layers of wires. The strand so formed may be hollow or closed, may be circular or non-circular. It may be complete in itself or may form the inner part of a strand built up around it. The number of wires included in the strand is variable and dependent upon the requirements of each case. In the case of closed strands of circular shape consisting of a single layer of wires, it is preferred to use four wires, but the method of manufacture is applicable to numbers of wires from three upwards.

The invention is concerned with the method of producing a deformation of the wires from their original circular form to a shape which approximates to a sector or a truncated sector. The wires are deformed and brought into the desired degree of closeness of fit against their neighbours by a process which forms part of the procedure gone through in the assembly of the wires in the strand.

In the improved method of manufacture of compacted wire strand, circular wires are drawn separately between shaping members, being thereby deformed, the deformed wires are then assembled, laid up helically together and drawn through a die, and are further deformed and simultaneously consolidated in a strand.

The method of deformation of the wires is by drawing with or without the assistance of rolling. The following definitions are assumed:

(1) Drawing is effected by applying the tractive force required to cause the strand or wire to pass through a fixed die or a roll die, wholly to the leading end of the strand or wire.

(1) Rolling is effected by transmitting the necessary tractive force to the wire or strand to cause it to pass therethrough by means of the rolls themselves.

In the process three operations are performed on the wires. In the first of these the separate wires are subjected to radial compression. In the performance of the second operation, the wires are assembled and circumferential compression is exerted on each wire by its neighbours. In the performance of the third operation, the assembled wires are compressed so that the final shape and dimensions are given to the strand. These three operations may be performed by three separate elements of a machine but in some cases two of the operations may be performed by the same or closely associated machine elements. Two of the operations, in some instances may follow each other in the same part of the machine, and may even merge into each other.

The shaping of the wires is performed while they are approaching each other to be assembled together in a single layer with the usual helical twist. The first operation of the shaping process is performed while the wires are still separated from each other. According to the invention it may be performed by a ring of separate dies, (each of which may be a group of rolls) one die for each wire, or by means of a single mandrel and a single die, the die having a tapering aperture, circular in section and surrounding the mandrel with a small clearance to form a converging annular throat. Alternatively, the shaping members may be a tapering mandrel, provided with shaping grooves, and a tapering die, and each wire will be deformed by contact with a groove and the die.

The second operation is performed by a die with a tapering mouth into and through which the deformed wires are drawn and within which they are assembled together in a layer. The final dimensions of this die are such that the wires coming from the first operation must undergo further change of shape in order that the assembly of wires may pass through.

The die for the second operation may be formed as a continuation of the die which has performed the first operation or it may be a separate die spaced axially away from the first die. It may be a solid die or may be split radially into fixed parts or into rolls which are free to turn. It may rotate with the bobbin carriage of the stranding machine or may be stationary.

The third operation is performed by means which is, for convenience, hereinafter referred to as the final die. It may consist of a single die which has a tapering mouth and has such a shape and dimensions as to complete the compression and shaping of the assembled wires. This final die may consist of a series of dies or of one or more groups of rolls or of one or more dies in combination with one or more groups of rolls. Some or all of the rolls may be driven to exert a rolling action on the strand. In some cases of the manufacture of a circular compacted strand, the die for the third operation may form part of, or be merged into, the die for the second operation. When manufacturing a non-circular compacted strand by the improved method, the required strand shape will be given by the third operation, which will usually be effected by a structurally separate die.

The invention is also concerned with the manufacture of non-circular, compacted wire strand of pre-spiralled form. That is to say, if the compacted strand is to form one of several which are subsequently to be laid up together it may be desired to pre-spiral the strand (that is, to give it a form which is twisted about an axis within itself) as the wires are being assembled. This twisted form has the lay of the final group of strands and may be produced by the rotation of the final die at the appropriate rate in relation to the forward movement of the strand through it. The pre-spiralling lay is generally longer than the lay of the wires in the strand.

The invention is also concerned with the production of a hollow single-layer compacted wire strand of circular or non-circular cross-sectional shape, in which the interior and the crevices on the inside of the layer of wires are completely filled with a rubber compound, bituminous compound or other mouldable, flexible and coherent material. By the improved method such a compacted strand is produced by compacting the component wires about a core of the filling material. The core is introduced within the group of wires of which the strand is to be formed, and is passed simultaneously with them through the apparatus in which the wires are subjected to the above-mentioned deforming operations. During the second and third operations, but more particularly during the third operation, the core is radially compressed by the surrounding wires, thereby being caused to fill completely the central space within the strand and to be forced into the crevices on the inner surface of the surrounding layer of wires. The original cross-sectional size of the core is made great enough, in comparison with the internal dimensions of the compacted wire strand, to ensure that the internal cavity and the crevices of the strand are completely filled in the finished product.

According to a further feature of the invention, instead of being formed wholly of mouldable, flexible and coherent filling material, the core may have embedded therein a wire, or group of wires, hereinafter referred to, for convenience, as an inner wire. In this case the size of the inner wire will be such that in the finished strand there will remain between the inner wire and the inner surface of the surrounding layer of wires a body of the filling material which completely separates the inner wire from the outer wires and fills the otherwise unoccupied space enclosed by the outer wires.

In a preferred method the core is formed of unvulcanised or partially vulcanised rubber compound which is sufficiently plastic to enter readily the crevices between the wires. The compacted wire strand may subsequently be provided in any known manner with an insulating covering of a similar rubber compound, for instance, applied longitudinally, which will fill the crevices on the outside of the strand. The rubber compound forming the core, and the covering if applied, may be subsequently vulcanised in one operation.

Another feature of the improved method concerns the manufacture of compacted wire strands of two or more layers in which the compacting of the wires is effected layer by layer, that is in single layers, and the number and diameter of the wires of each layer are so chosen that these wires, if assembled in a layer of the desired form but without deformation of the wires, would not fit upon the next inner layer, that is to say they would enclose a space larger than that occupied by the part of the strand which is to lie within them.

In following the usual procedure of building up a strand from a number of circular wires all of the same initial size, the numbers taken for the layers would be different in the present case from those usually adopted. For instance, starting with a single wire as the centre the next layer would consist of eight wires, the next outer one would consist of sixteen wires and the next outer one of twenty-four wires. The total number of wires included by any layer and those within it will be seen to be as follows: 1, 9, 25 and 49. As another example, starting with four wires, the next layer would consist of twelve, the next of 20 and the next of 28. The numbers enclosed by any layer would then be as follows: 4, 16, 36 and 64. It will be noticed that in each case the number of wires enclosed by any layer is a square number. This method, following the usual practice of using wires of the same size throughout, will, generally, be found most convenient, but it is not essential to the invention that it should be adopted. By a simultaneous adjustment of the diameter of wires and number of wires per layer, the indicated conditions can be obtained. By taking wires of the same size in each layer and in numbers as indicated above the minimum deformation of each wire would usually be obtained. Similarly the taking of the increased volume of round wires per layer in accordance with this feature of the invention results in the production of a compacted strand with less deformation than would be required if the normal number and sizes of wires were employed. Further, since the method gives control of the closeness of fit of each layer on its next adjacent inner layer, the deformation or compression of such layers when assembling outer layers on them can be avoided.

In the compacting of the strand each wire, other than the wires of a single layer solid strand, changes from the circular shape to a shape in which the cross-section approximates to a figure bounded by two radial lines and two circular arcs, that is, a truncated sector. This is done, in the manner previously referred, by a drawing process, with or without the assistance of rolling, involving three operations which may be effected in two stages by combining, in the manner already described, the first and second or second and third operations into one stage. At the end of the operations the deformation of the wires of the layer being operated upon is substantially complete at the time of first engagement between the adjacent surfaces of the layer and the inner part of the strand around which it is formed.

The improved method of manufacture is more particularly described hereinafter and illustrated, by way of example, in the accompanying drawings wherein.

Figure 1:
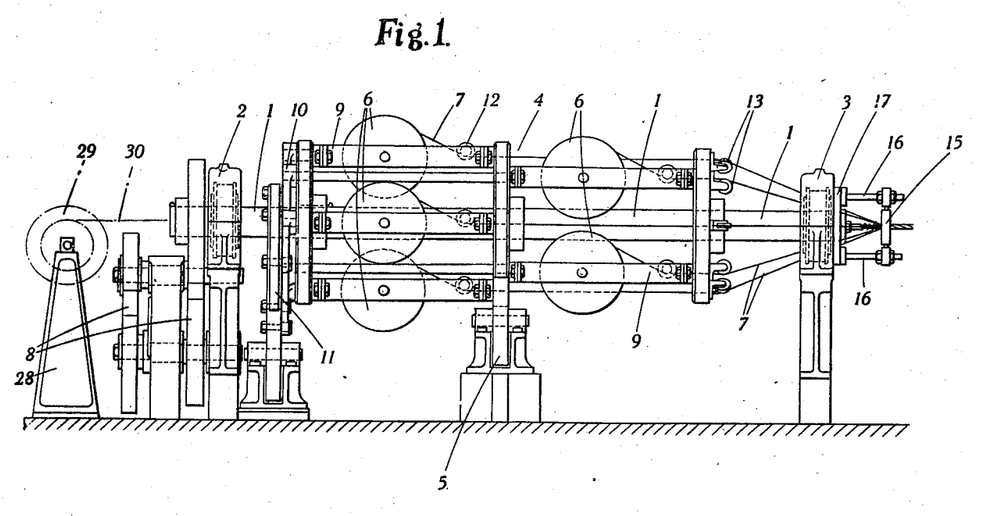
Figure 1 is a view of part of one form of stranding machine for carrying out the process.
Figure 1A:
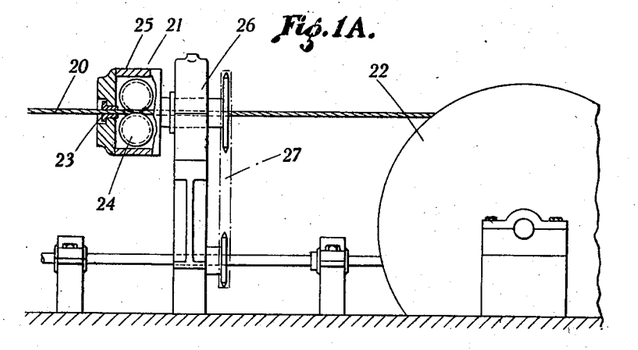
Figure 1A is a view of the remaining part of the machine represented in Figure 1.

The machine illustrated in Figures 1 and 1A comprises a hollow shaft 1 rotatably mounted at its ends in bearings 2 and 3 and having keyed thereto a bobbin carriage 4 which is additionally supported at about its centre by freely rotatable rollers 5. In the bobbin carriage 4 are mounted a set of bobbins 6, each one of which supplies one of the wires 7 of which a compact wire strand is to be constructed, the number of bobbins corresponding with the number of wires in the strand. The bobbin carriage is rotated by means of gears 8 located at the back of the machine behind the rearmost bearing 2. Each bobbin 6 is rotatably supported, with its axis disposed transversely to the axis of the hollow shaft 1, in a frame 9 which is freely mounted in the bobbin carriage 4, and is provided with a crank lever 10 projecting vertically downwards at the rear of the carriage. The ends of all the crank levers 10 are connected to a weighted ring 11 which, as the bobbin carriage 4 rotates, maintains each crank lever 10 in the vertical, dependent position, thereby maintaining each bobbin axis in a horizontal plane. Each wire 7 is led from a bobbin 6 over a guide pulley 12 to the front of the bobbin carriage 4 where it is deflected over a final guide pulley 13 towards the axis of the machine.

In front of the forward bearing 3 is located a die 14 (Figure 7) mounted in a die-carrier 15 which is supported between two horizontal rods 16 projecting forward from a flange 17 formed on the end of the shaft 1. The wires 7 passing from the final guide pulleys 13 pass through the frame of the forward bearing 3 and converge on the axis of the machine in the tapering mouth of the die 14. A tapered mandrel 18, mounted in an externally screw-threaded tube 19 projecting forward from the centre of the flange 17, is located with its reduced end inserted within the mouth of the die 14. The mandrel 18 is carried by a rod 39 which slides within the tube 19 and the mandrel 18 is maintained in its forward position by means of a compression spring 36 which surrounds the rod 39, bearing at one end upon the end of the tube 19 and at the other upon a collar 37 formed behind the mandrel on the rod 39. The forward end of the tapered mandrel is preferably ground to a spherical shape. There is thus formed by the die 14 and the forward end of the mandrel 18 a converging annular throat through which the wires 7 pass and are operated upon in a manner hereinafter described. The pressure of the mandrel 18 upon the wires is regulated by screwing the tube 19 into or out of the flange 17. The effect of the spring 36 is to permit the mandrel 18 to float so as to equalise, and to obtain a fine adjustment of, the pressure applied upon the wires. The wires 7 are stranded together in the die 14, and the strand 20 thus formed is drawn through a final die 21 whereby it is further operated upon. After leaving the final die 21 the finished strand is wound around a capstan 22 by means of which the longitudinal movement of the wire through the machine has been effected.

The final die 21 is a composite member consisting of an apertured die 23, through which the wire strand is first drawn, and a pair of grooved rolls 24 between which the wire finally passes. The apertured die 23 and the pair of rolls 24 are arranged within a common housing 25 which is mounted within a bearing 26 and is adapted to be rotated about the axis of the machine by means of a chain-drive 27 if desired.

Behind the machine is located a stand 28 upon which may be mounted a bobbin for supplying a core of filling material during the production of a filled hollow compact wire strand. In this case the core passes through the hollow shaft 1, through a central bore 38 formed for this purpose in the mandrel 18 and in its supporting rod 39, and is enclosed within the wire strand 20 as the latter is formed within the die 14.

Figure 7:
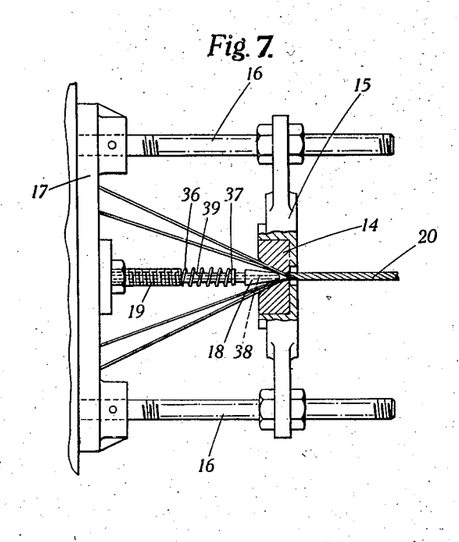
Figure 7 represents to a larger scale a portion of the machine shown in Figures 1 and 1A.
Figure 8:
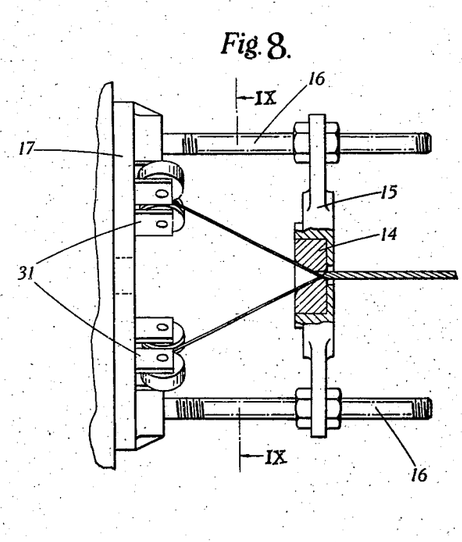
Figure 8 represents a modified form of the arrangement shown in Figure 7.
Figure 9:
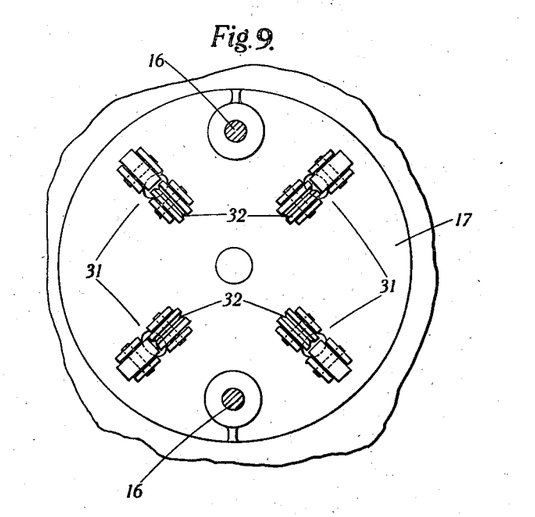
Figure 9 is a sectional view taken on the line IX—IX in Figure 8.

In Figures 8 and 9 is shown another arrangement of dies which may be used in place of the arrangement already described with reference to Figure 7. In this modification there are disposed on the flange 17 in a circle about the axis of the machine a number of pairs 31 of rolls. The die 14 is provided as before, mounted in a die-holder 15 between two rods 16, but the mandrel described in connection with the previous arrangement is omitted. In this construction the function previously performed by the mandrel in conjunction with the die 14 is performed by the group of pairs 31 of rolls before the wires converge at the die 14.

Figure 10:
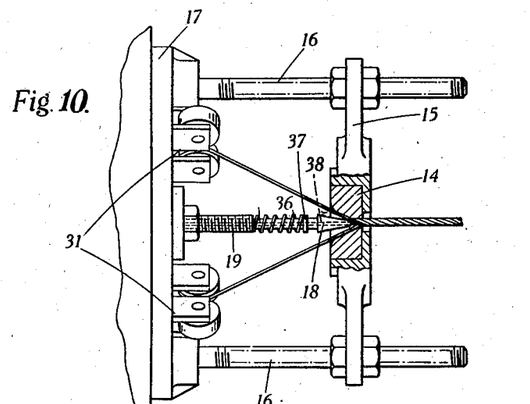
Figure 10 is another modification of the arrangement shown in Figure 7.

In Figure 10 is shown a further modification of this arrangement which is a combination of the previously described arrangements. In this construction there is provided a ring of pairs 31 of rolls mounted on the flange 17, a die 14 mounted in a die-holder 15 between two rods 16, and a tapering mandrel 18 located with its forward end within the mouth of the die 14. The function which in the construction shown in Figure 7 is performed in the converging annular throat between the mandrel 18 and die 14, and which, in the construction shown in Figures 8 and 9, is performed by the pairs 31 of rolls, is in this construction performed in part by the pairs of rolls and in part by the mandrel in conjunction with the die.

The diagrammatic Figures 11 to 18 illustrate the formation of various forms of single layer compacted wire strands by means of the apparatus described above. In each instance, in quadrant A is represented the appearance of the component wires 7 of the strands if stranded together with an undeformed circular section. In quadrants B, C and D are represented the successive stages of deformation of the wires as the result of the three operations performed upon them; quadrant B showing the effect of radial compression on the separate wires, quadrant C their assembly into the strand and their partial compacting, and quadrant D the final consolidation.

Figure 11:
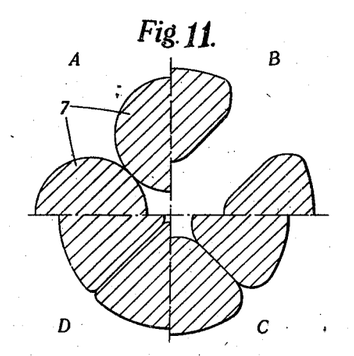
Figures 11 to 22 are diagrammatic representations illustrating the various stages of the process of forming various constructions of compacted wire strand in accordance with the invention.

Figure 11 represents the formation of the first of four principal types of products. This is a closed circular strand in which each of four wires approximates to a sector in shape. In the first operation the round wires 7 are each passed through a pair of rolls 31 (Figures 8 and 9) which are shown as rotating in a plane radial to the axis of the machine. In the surface of one roll is a deep groove, in the other a shallow groove or no groove at all. The inner part of each wire is forced to take up a V-shape, and, at the same time, the radius of curvature of the outer part of the wire is increased. In order to obtain this shaping of the wires, the groove 32 formed on the inner roll will be of V-shape, or of a parabola or other shape, having its sides approximately inclined to each other at an angle near to that which the sides of the wire will have when finally assembled in the strand. Thus in this case, since the strand consists of four wires, the sides of the wire will be at 90° and the sides of the groove 32 may enclose an angle equal to this or somewhat greater or smaller. It is convenient to make a strand of this type of four wires, but the method is applicable to numbers from three upwards. After passing between a pair of rolls 31 each wire has been deformed as indicated in quadrant B. The wires now converge to the mouth of the die 14, in which they are stranded together, and compressed, so as to bring them to the sector form as shown in quadrant C. In this second operation or partial compacting, the sides of each wire are pressed by engagement with the adjacent wires in such a way as to cause the metal to move towards the corners of the sector and make these corners sharper. The curvature of the outside of each wire is also constrained to approach more nearly that of the final form. The third and final operation is effected in the final die. In this final operation the strand is given its finished compacted form as represented in quadrant D, in which the shape of each wire approximates to a sector, and the amount of unoccupied space between the wires of the strand is a minimum.

Figure 12:
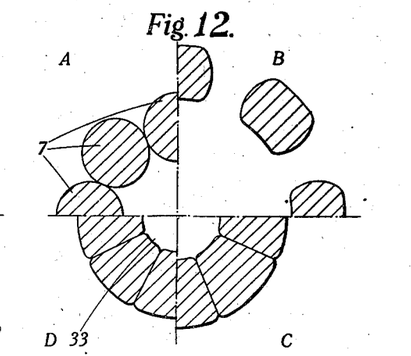

Figure 12 illustrates the formation of the second principal type which is a hollow circular strand in which the final shape of each wire is the form of a truncated sector. The strand represented in this figure is constructed of eight wires 7, originally of circular shape, and which, if assembled undeformed, would have the form indicated in quadrant A. In the first operation each wire is radially compressed by passage through the converging annular throat formed between the mandrel 18 and the mouth of the die 14, the ultimate shape of the wire at this stage being shown in quadrant B. During further passage through the die 14 the wires are assembled and partially compacted to the shape shown in quadrant C. The final compacting to the form shown in quadrant D is effected by a die in manner similar to that of the previous case.

In such a strand which is intended to be self-supporting the central space 33 constitutes a comparatively small proportion of the total area of cross-section, say, not more than 15%. If such a hollow strand is to be supported by some outer layer of wires or other wrapping then it is possible to make the cavity a larger proportion of the total area.

Figure 13:
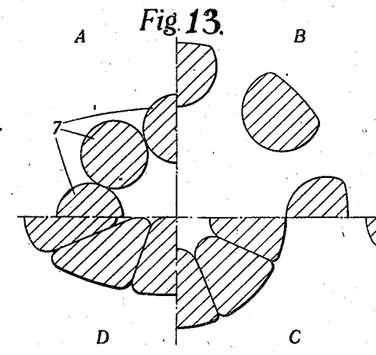

Figure 13 illustrates the production of a third principal form of strand which is closed, and is of non-circular section. The strand represented in this figure is of eight wires 7, originally of circular shape as shown in quadrant A. The wires are first deformed by radial compression to the form shown in quadrant B in a manner as described with reference to Figure 11. They are then assembled and partially compacted to form a circular strand as represented in quadrant C by a second operation, also in the manner described with reference to Figure 11. The partially compacted strand then enters the final die which may be of the nature of the arrangement 21 (Figure 1A), of the required final shape, and in this operation the wires have their shapes modified by the combined pressure of the final die and the surface of adjacent wires so as to give them the desired form and dimensions as represented in quadrant D.

Figure 14:
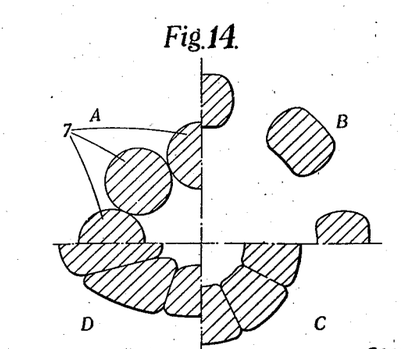
Figure 15:
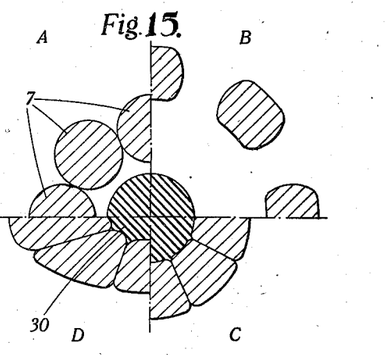

In Figure 14 is illustrated the fourth principal type of compacted wire strand which is hollow and of non-circular section. It is produced in a manner similar to that employed in the production of the hollow circular strand above described, excepting that the final die completes the consolidation of the strand to a non-circular shape.

Either of the non-circular strands described above may be pre-spiralled during the third and final operation of the process. This is effected by rotating the final die about the axis of the machine by means of the chain drive 27 (Figure 1A). The speed of rotation of the final die is so regulated with reference to the forward movement of the strand that the finished strand is pre-spiralled with a pre-determined pitch, which itself depends upon the requirements of subsequent cable-forming operations.

In the production of the strands represented in Figures 12 and 14, the first and second stages of the deformation of the wires may be carried out by means of a modified arrangement of dies, such as is shown in Figure 8. That is to say, the first deformation of the wires may be effected by passing each one through one of a ring of dies, such, for instance, as the groups of rolls 31. In this case, the use of a mandrel 18 (Figure 7) is not essential and the second operation only of the process is carried out in the die 14, to which the wires converge, and in which they are assembled. Alternatively, the combined arrangement of dies shown in Figure 10 may be used.

Figure 16:
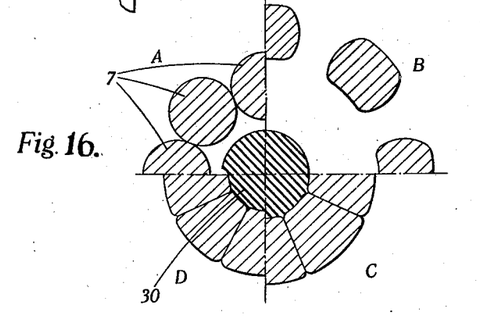

The interior of a hollow, non-circular compacted wire strand may be completely filled with a core of mouldable, flexible and coherent material. In the preferred method this material consists of unvulcanised or partially vulcanised rubber compound which is sufficiently plastic to enter readily the crevices between wires on the inside of the layer. It may be introduced from a supply bobbin 29, which may conveniently be mounted for this purpose on a stand 28 at the rear of the machine (Figure 1), and will be enclosed by the wires as they are assembled during the second stage of the process. During the second and third operations, but more particularly during the third operation, the core is radially compressed by the surrounding wires, thereby being caused to fill completely the central space within the strand and to be forced into the crevices on the inner surface of the surrounding layer of wires (quadrant D Figure 15). The original cross-sectional size of the core is made great enough, in comparison with the internal dimensions of the compacted wire strand, to ensure that the internal cavity and the crevices of the strand are completely filled in the finished product. A hollow circular compacted wire strand such as is indicated in Figure 12 may be filled with such material in a similar manner, as is illustrated in Figure 16.

Figure 17:
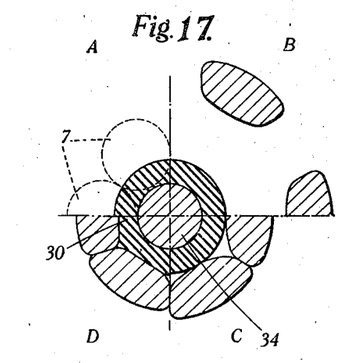
Figure 18:
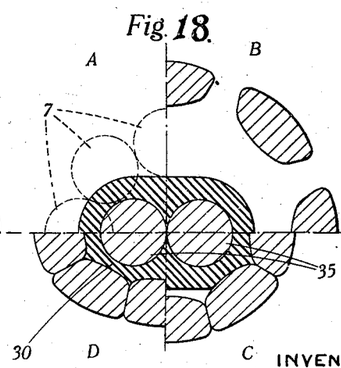

As represented in Figures 17 and 18 the core 30 of filling material may have embedded therein a wire, or a group of wires, which will, in the finished strand, be completely separated from the outer wires by the filling material. Figure 17 illustrates the production of a circular strand having a core 30 of the filling material in which one wire 34 is embedded. Figure 18 illustrates a non-circular strand having a core of filling material in which two wires 35 are embedded. In both these constructions the number of wires in the compacted layer is so chosen as to permit such reduction in their radial thickness being effected in the compacting of the layer to its final diameter that in the finished strand there remains between the embedded wires and the inner surface of the surrounding wires a body of the filling material, which completely separates the inner wire from the outer wires and fills the otherwise unoccupied space enclosed by the outer wires.

The strand represented in Figure 17 consists of an outer layer, formed from six originally circular wires 7, and the inner wire 34. The latter is circular and of substantially the same cross-sectional area as each of the outer wires. The strand represented in Figure 18 consists of an outer layer, formed from eight originally circular wires 7 and the two inner wires 35. The latter are each circular and of substantially the same cross-sectional area as each of the outer wires. In the construction of both forms the first and second stages of the deformation of the wires are carried out either by the arrangement of dies in Figure 7, or by those according to Figure 8, or by means of the apparatus described above with reference to Figure 10. By the latter arrangement the first deformation of the separate wires is effected in two steps, first by passage through groups of rolls 31, and secondly by passage between the mandrel 18 and die 14. The radial thickness of the wires 7 will generally need to be reduced to a greater extent than in the case of the other types of hollow compacted wire strands. The second and third operations are effected in a manner as already described. In the finished strand the reduced radial thickness of each of the outer wires allows sufficient clearance for accommodation of the filling material between the inner and outer wires. The composite core in both constructions represented in Figures 17 and 18 is fed to the point of assembly of the wires into the strand in a manner similar to that described previously for a homogeneous core 30 of filling material.

Figure 2:
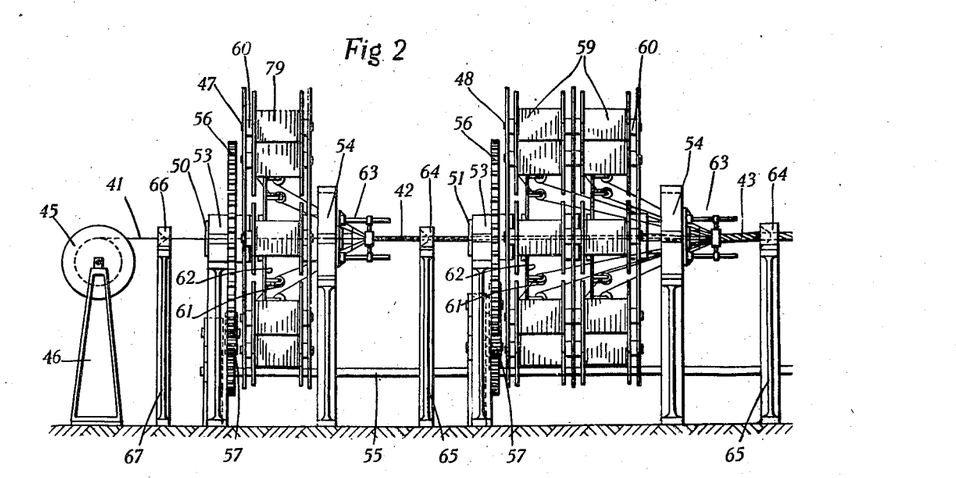
Figure 2 is a view of part of another form of stranding machine for carrying out the process.
Figure 2A:
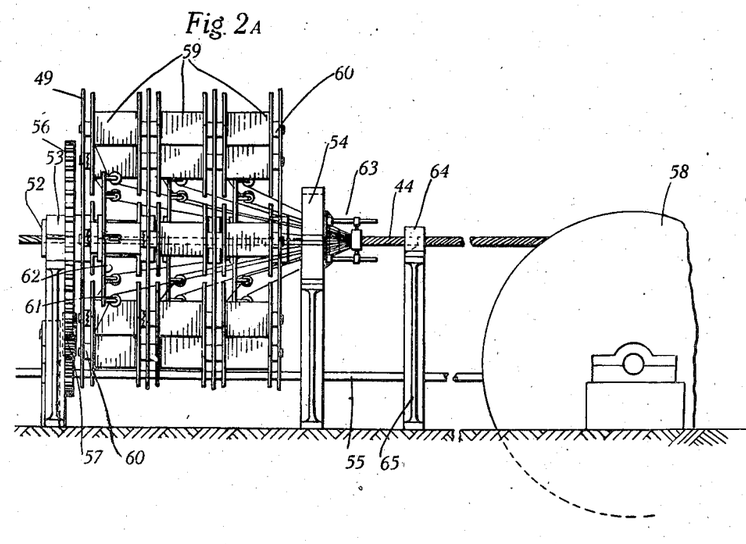
Figure 2A is a view of the remaining part of the machine represented in Figure 2.

The stranding machine represented in Figures 2 and 2A is adapted for the production of a compacted wire strand consisting of a number of layers, in which each layer is compacted independently of that part of the strand which it encloses.

In the particular example illustrated the strand to be formed comprises a single axial wire core 41 about which are laid three concentric layers of wire, 42, 43 and 44 consisting of 8, 16 and 24 wires respectively. The central wire 41 is supplied from a bobbin 45 mounted upon a stand 46 at the back of the machine. The successive layers of wire 42, 43 and 44 are applied by means of three cages 47, 48 and 49 adapted to rotate about the common machine axis, being built upon hollow shafts 50, 51 and 52, each of which is supported in a bearing 53 at the rear and a bearing 54 at the front of the cage. The drive to each cage is obtained from a lay shaft 55 disposed parallel to the machine axis, a gear wheel 56 located on the shaft at the rear of each cage being maintained in communication with the lay-shaft 55 by means of a train of gears 57. The gear-train drive to the central cage 48 is such that the cage may rotate in direction opposite to that of the first and third cages 47 and 49 or in the same direction as those cages so that the direction of lay of the wires 43 may be the same or opposite to that of the underlaying and overlaying wires 42 and 44. A capstan 58 mounted in front of the machine, adapted to be driven from the lay-shaft 55, serves to draw the strand through the machine. Each rotating cage carries the appropriate number of bobbins 59 loaded with wire. Thus the cage 47 carries eight bobbins, the cage 48 sixteen bobbins and the cage 49 twenty-four bobbins. Each bobbin 59 is mounted on a stationary spindle 60 so as to rotate thereon as the wire is withdrawn. In an alternate arrangement the bobbins may be mounted in cradles, such as the frames 9 of the machine shown in Figures 1 and 1A, adapted to give a back rotation in known manner with respect to the motion of the cages in order to counteract the twisting of the wires as they are drawn from the bobbins. Furthermore, each of the cages 47, 48 and 49 may be caused to rotate in the same direction by suitably selecting the driving gears 57, in which case the direction of twist of each layer of wires in the strand would be the same, although the pitch of twisting will usually be different for each layer. After leaving the bobbin each wire passes round a guide in the form of a small freely rotatable pulley 61. The guide pulleys 61 are arranged radially round the machine axis upon carriers 62 fixed to the hollow shafts 50, 51 and 52. Each wire passes from the guide pulley to a head 63 located in front of each bearing 54, fixed to the end of each of the shafts 50, 51 and 52 and consequently rotating with the corresponding cage.

The first stage of the strand-forming operation is performed in the head 63. In front of each head 63 and close to it is mounted a die 64 which may be fixed or made to rotate. In the arrangement shown in Figures 2 and 2A each die 64 is fixed, being mounted on a pedestal 65. The second stage of the strand-forming operation takes place in the die 64. In front of the supply bobbin 45 for the central wire 41 is also mounted, on a pedestal 67, a fixed die 66 through which the wire 41 is drawn to ensure that its cross-sectional area is reduced to the same extent as that of the individual wires of the superimposed layers during the strand-forming operation.

Figure 3:
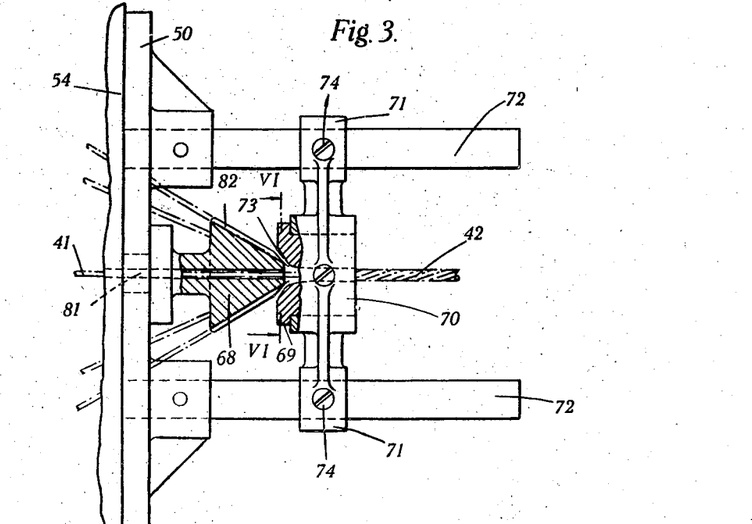
Figure 3 is a view, in part section, of a portion of the machine shown in Figures 2 and 2A on a larger scale.

The rotating head 63 located in front of the first cage 47 is shown in greater detail upon a larger scale in Figure 3. It comprises a mandrel 68 and a die 69, referred to hereinafter with reference to this illustration as the first die; the die 64 situated in front of the head 63 is referred to as the final die. The mandrel 68 is of approximately conical form, tapering towards its forward end. The first die 69 is mounted in a die carrier 70 provided with radial arms 71 which are slidably engaged with two or more parallel guide bars 72 attached, together with the mandrel 68, to the cage spindle 50. The tapered end of the mandrel 68 is inserted within the end of the first die aperture, so as to leave between the two surfaces a converging annular throat 73, the size of which is regulated by sliding the die carrier 70 on the rods 72, locking screws 74 being provided to fix the die carrier in the desired position. The radial dimension of the throat 73 is adjusted to be less than the diameter of the wires to be drawn therethrough.

Figure 4:
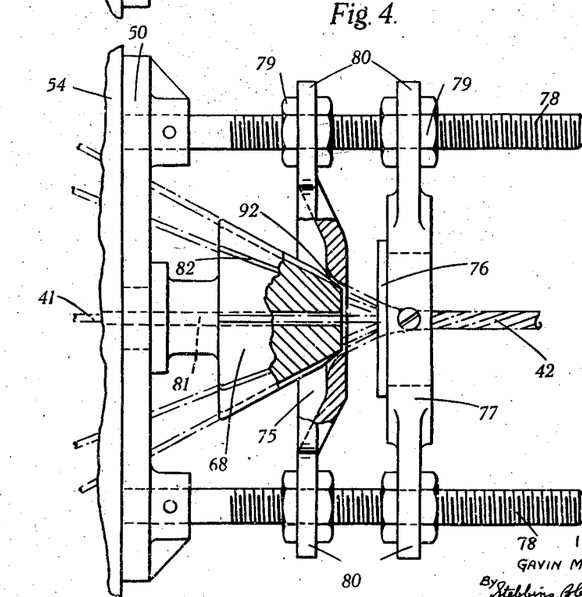
Figure 4 is a similar view of a modified form of the arrangement shown in Figure 3.

Figure 4 represents a modified form of the rotating head 63, in which the first die is divided into two members. The first of these is a die-plate 75 having a central aperture into which the tapered end of the mandrel 68 is inserted to form the converging annular throat 92. The other member comprises a die 76, preferably a two-part member, mounted in a die-carrier 77. Both members are slidably mounted between two parallel screw-threaded guide-bars 78, projections 80 on those members engaging the bars and being clamped thereto in the desired positions relative to one another and the mandrel by means of nuts 79 threaded on the guide bars.

Figures 5, 6:
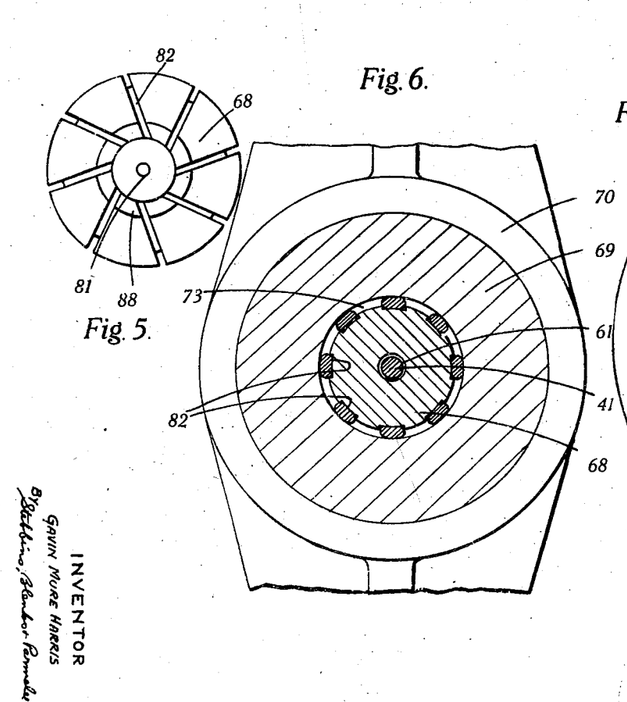
Figure 5 is an end view of a modified form of a portion of the machine shown in Figures 2 and 2A.
Figure 6 is a sectional view of the arrangement shown in Figure 3 on the line VI—VI.

In both arrangements illustrated the mandrel 68 has a central aperture 61 through which passes the central wire 41, or in subsequent stages the previously stranded core, about which the new layer of wires is to be placed. The core may, for instance, comprise a single layer compacted wire strand such as described above with reference to Figures 11 to 18. The surface of the mandrel has grooves 62, corresponding to the number of wires to be applied at this stage, which serve to ensure that the wires are held in the correct spacing. The grooves 62 are comparatively deep at the point of entry of the wires, in order to prevent their displacement. The angle of taper of the mandrel 68 is increased at the forward end thereof, as indicated (88) in Figure 5, thereby reducing the depth of the grooves so as to permit the wires to be engaged in the desired manner in the first die aperture. The grooves 62 may have an approximation to a helical form as represented in Figure 5, thereby serving to lead the wires to the annular throat 73 at the correct angle. Instead of the particular form of mandrel and die, or dies, thus described with reference to Figures 3, 4 and 5, there may be used any arrangement such as is hereinbefore described with reference to Figures 7 to 10.

Figure 19:
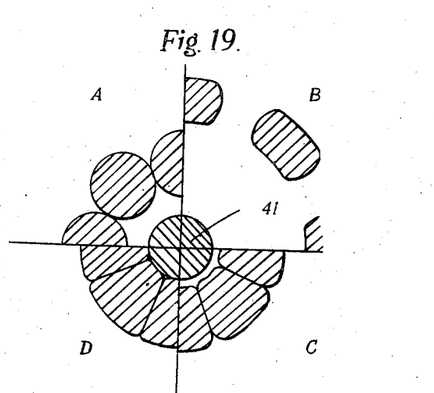

In Figure 19 is illustrated diagrammatically the various steps in the compacting of the first layer of eight wires 42 surrounding the single central wire 41. If the originally round wires were arranged as shown in quadrant A of Figure 19 concentrically about the inner wire 41, touching one another so as to form a layer of circular section, the enclosed space would be substantially larger than that occupied by the central core. This applies also in the case of succeeding layers. Since the diameter of the wires is greater than the radial width of the converging throat 73, they are subjected to a drawing operation during their passage therethrough. Thus at the extremity of the mandrel 68 the wires are reduced in dimensions radially and increased in dimensions circumferentially, thus assuming the form shown in the quadrant B of Figure 19. With the arrangement shown in Figure 3 this change representing the first operation takes place in the mouth of the first die 69, as represented in section in Figure 6, subsequent movement of the wires through this die effecting the second operation, that is, continuing the compacting and assembling of the deformed wires about the central core so that when they leave this die the wires are assembled about the core in the manner shown in quadrant C of Figure 19. In the arrangement of Figure 4 the initial change of shape occurs in the mouth of the die plate member 75 of the first die, the continued compacting and assembly of the wires being effected in the other part 76 of the first die. Thus is effected the preliminary stage of the compacting operation. The final die 64 located in front of each rotating head 63 is of slightly conical form and serves to complete the compacting of the appropriate layer of wires. The strand issuing from the die 64 is in the form of a compacted wire strand as represented in quadrant D of Figure 19. As previously mentioned this second die 64 may be stationary as represented in Figures 2 and 2A, or it may be rotatable. It may comprise one or more units each consisting of a known form of stationary or roller die. The internal dimensions of the dies will be determined by the size of the strand at the situation of the individual dies and will naturally increase progressively as the strand is built up.

By the machine above described the strand manufactured comprises a single central wire with three concentric layers applied thereto consisting of 8, 16 and 24 wires respectively.

Figure 22:
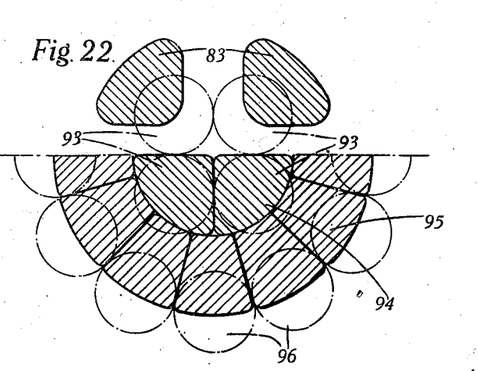
Figure 23:
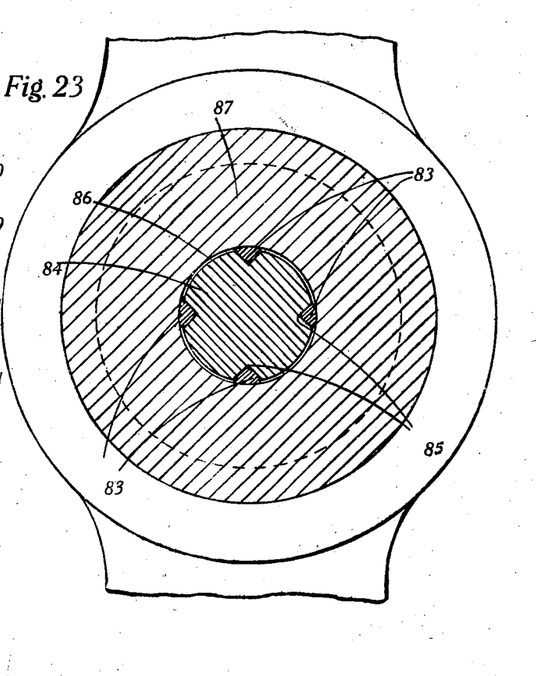
Figure 23 is a view similar to that of Figure 6 of a modified form of the arrangement shown in Figure 6.

If a larger strand is required, further layers may be applied by the addition in a known manner of further stranding cages each provided, in the manner previously described, with the requisite number of bobbins. Further, the single central wire may be replaced by a composite four-wire core of compact form, the layers of the subsequently formed strand consisting of 4, 12, 20 and 28 wires, i. e., each layer containing eight more wires than the succeeding layer. The central compact four-wire core may be supplied from the single bobbin 45 at the back of the machine. Alternatively it may be formed from four round wires in a manner similar to that already described with reference to Figure 11 or to that employed in forming the succeeding layers. Thus the single bobbin may be replaced by a stranding unit, similar to the stranding unit 7 but mounting four bobbins for the supply of four round wires. These four wires, if twisted together without deformation, would produce a strand, a cross-sectional view of which would be as represented by the group of circles 93 shown in broken lines in Figure 22. In order to obtain a compacted four-wire core, the wires are passed, during stranding, through a head such as the one shown in Figure 3 or in Figure 4, the view in Figure 23 representing their passage through the first-mentioned form. The mandrel 84 may in this case be solid and is formed with four surface grooves 85 of quadrantal cross section. This form of the grooves 85 ensures that during the drawing operation in the converging annular throat 86 between the end of the mandrel 84 and the first die 87 the wires will be given substantially a quadrantal section 83 (Figures 22 and 23). During their subsequent passage through the die 87 and a final die, deformation of the wires is completed to obtain a compacted circular core 94 such as is shown in part in Figure 22. Further compact layers may be applied in the manner described above with reference to the single wire core, the lower portion of Figure 22 representing the application of the first, 95, of such layers. The compact layer 95 is formed of 12 wires, originally circular and equal in diameter to the original diameter of each of the four inner wires, and which if stranded about the compact four-wire core without deformation would occupy a position as represented by the outer arrangement of circles 96 shown in broken lines.

If, instead of the production of a circular strand, a strand of some other final form is required, this non-circular shape can be imparted by the action of the final die in the manner already described with reference to the production of a single layer compacted wire strand. The control of the wires during assembly and of the shape given to the layer by the process of compacting described, permits of the making of layers of different shapes, each layer making contact with the next at smaller or greater regions instead of over the complete surface, the increase in the number of wires in each succeeding layer not being necessarily the same as in the case of the circular strand. For instance, a strand having an oval shape may be produced from a circular inner part, the innermost layer touching this circular part, and each of the outer layers touching the preceding inner layer of the minor axis of the ellipse.

Figure 20:
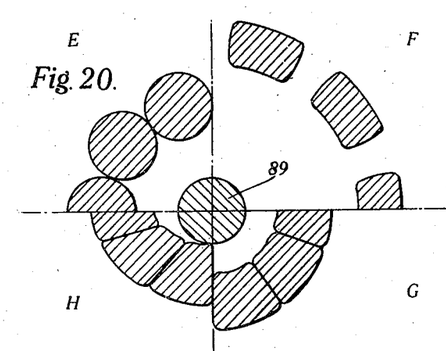
Figure 21:
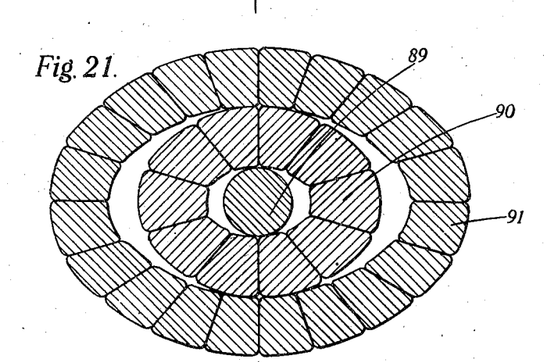

Such an oval shaped compact strand is illustrated in section in Figure 21. It comprises a single central round wire 89, with two superimposed layers of wires, the innermore layer 90 of which is formed from ten round wires which, if assembled undeformed about the central wire would occupy the circular position represented in the quadrant E in Figure 21. The wires of this layer are, however, subjected to the deforming process described above in connection with the circular strand so as to be successively deformed in the manner represented in quadrants F, G and H of Figure 20. The oval shape, represented in quadrant H, and in the illustration of the complete strand in Figure 21, is imparted by the final die during the last compacting stage, the aperture of this die being shaped in accordance with the required cross-sectional shape. Thus there is formed a self-supporting compacted oval layer 90 of wires which touches the circular interior member 89 only about the minor axis of the ellipse. Similarly another compacted layer 91 of twenty wires may be formed about the first layer 90, touching that layer only about the minor axis.

The substantial independence of the structure of each layer, of a multi-layer compacted wire strand produced in accordance with the invention, on the form and nature of the layer or core which it encloses, permits the use of various materials, either metallic or otherwise, for the central part of the strand. Similarly the whole strand can be produced by building up a number, say three, of compacted layers without a central core.

In a conductor formed as a hollow compacted wire strand with filled interior in accordance with this invention, there will exist no spaces into which moisture can be drawn in the event of the cable, incorporating such a conductor, breathing during heating and cooling cycles. Furthermore, there can be no movement of moisture along the conductor from a localized penetration of the outer covering. A cable incorporating such a moisture-proof conductor is consequently not subject to deterioration by the penetration of moisture along the conductor.

By the carrying out of the process of forming the compacted wire strand in stages, a more compact strand can be made for a given reduction of cross-sectional area than would be the case if single stage working only were employed. Alternatively, the same compactness may be attained with less reduction of sectional area.

Since the compacting of the strand is largely a drawing process, there are involved considerable forces acting on the strand; anti-friction bearings of any suitable form may therefore be provided in a known manner to take up the pull on the rotating parts, and furthermore the dies may be lubricated in any known manner.

What I claim as my invention is:

1. A method of manufacture of compacted wire strand in which circular wires are drawn separately between shaping members, being deformed thereby, the wires are then assembled, laid up helically together and drawn through a die, and are further deformed and simultaneously consolidated in a strand.

2. A method of manufacture of compacted wire strand in which circular wires are drawn separately between a tapering mandrel, provided with shaping grooves, and a tapering die, being deformed by the contact with the grooves and die, and the wires are then assembled, laid up helically together and drawn through a die, being further deformed thereby and simultaneously consolidated in a strand.

3. A method of manufacture of compacted wire strand in which circular wires are separately deformed by radial compression in shaping means, the wires are then laid helically together in a layer in such a way that circumferential compression is exerted on each wire by its neighbours, and the layer of wires is then compressed to the final shape and dimensions.

4. A method of manufacture of compacted wire strand in which circular wires are separately deformed by radial compression in a converging annular throat formed between a mandrel and a die, the deformed wires are then laid helically together in a layer in such a way that circumferential compression is exerted on each wire by its neighbours, and the layer of wires is then compressed to the final shape and dimensions.

5. A method of manufacture of compacted wire strand in which, during stranding, each of a number of circular wires is first deformed by subjecting it separately to radial compression during its passage through a die, the deformed wires are then laid helically together in a layer and circumferentially compressed by passage through another die, and the layer of wires is then compressed to the final shape and dimensions.

6. A method of manufacture of non-circular pre-spiralled compacted wire strand in which each of a number of circular wires is first deformed by subjecting it separately to radial compression, the wires are then laid helically together in a layer and circumferentially compressed, and the layer of wires is then compressed to the final non-circular shape and dimensions by passage through means which is rotated about the axis of the strand at a speed which bears a pre-determined relation with the speed of longitudinal movement of the strand, the relation being determined by the required pitch of the pre-spiralled strand.

7. A method of producing compacted wire strand, the interior of which is completely filled with a mouldable, flexible and coherent filling material, in which, each of a number of circular wires is first deformed by subjecting it separately to radial compression, the wires are then laid helically together in a layer about a core of the filling material and circumferentially compressed, the layer of wires is then compressed to the final shape and dimensions, and the core of filling material is thereby radially compressed by the surrounding wires to completely fill the interior of the strand.

8. A compacted wire strand, the interior of which is completely filled with a mouldable, flexible and cohesive filling material, produced by the method claimed in claim 12, in which a wire, or group of wires, is embedded in the filling material and is separated thereby from the surrounding strand.

9. A method of manufacture of compacted wire strand comprising the steps of assembling, around an inner part of the strand, a layer formed of circular wires, of which the number and diameters are so selected that, if closely assembled while undeformed in a layer of the same shape as the exterior of the said inner part, they would enclose that part with substantial clearance around it, and deforming the wires of this layer during assembly to bring the size of the layer down to cause it to fit on the said inner part, the deformation of the said wires being substantially complete at the time of first engagement between the adjacent surfaces of the layer and the said inner part.

10. A method of manufacture of compacted wire strand comprising the steps of assembling, around an inner part of the strand, a layer formed of circular wires, of which the number and diameters are so selected that, if closely assembled while undeformed in a layer of the same shape as the exterior of the said inner part, they would enclose that part with substantial clearance around it, and deforming the wires of this layer during assembly to bring the size of the layer down to cause it to fit on the said inner part, said deforming being carried out in two stages, in the first of which the wires are reduced in radial dimensions and increased in circumferential dimensions, and in the second of which they are brought into their final form.

11. A method of manufacture of compacted wire strand comprising the steps of assembling, around an inner part of the strand, a layer formed of circular wires, of which the number and diameters are so selected that, if closely assembled while undeformed in a layer of the same shape as the exterior of the said inner part, they would enclose that part with substantial clearance around it, and deforming the wires of this layer during assembly to bring the size of the layer down to cause it to fit on the said inner part, said deforming being carried out in two stages, in the first of which the wires are acted on singly and are reduced in radial dimensions, and in the second of which they are laid together and brought into their final form.

12. A method of manufacture of compacted wire strand comprising the steps of assembling, around an inner part of the strand, a layer formed of circular wires, of which the number and diameters are so selected that, if closely assembled while undeformed in a layer of the same shape as the exterior of the said inner part, they would enclose that part with substantial clearance around it, and deforming the wires of this layer during assembly to bring the size of the layer down to cause it to fit on the said inner part, said deforming being carried out in two stages, in the first of which the wires are compressed radially by being drawn through a converging annular throat between a mandrel and a die and in the second of which the wires are brought together and finally shaped in a die.

13. A method of manufacture of circular compacted wire strand, in which the compacting of the wires is effected layer by layer so that the deformation of the wires of any one layer is substantially complete at the time of first engagement between the adjacent surfaces of that layer and an underlying inner part of the strand, and in which all the wires of the strand are originally circular wires of the same diameter and the number of wires enclosed by any layer is a square number.

GAVIN MURE HARRIS.